(12) United States Patent
Hagiwara et al.

(10) Patent No.: US 7,477,628 B2
(45) Date of Patent: Jan. 13, 2009

(54) HYBRID ARQ COMMUNICATION APPARATUS AND METHOD

(75) Inventors: Yuichi Hagiwara, Yokohama (JP); Yoichi Maeda, Yokosuka (JP)

(73) Assignee: Panasonic Corporation, Osaka (JP)

( * ) Notice: Subject to any disclaimer, the term of this patent is extended or adjusted under 35 U.S.C. 154(b) by 480 days.

(21) Appl. No.: 10/550,597

(22) PCT Filed: Apr. 5, 2004

(86) PCT No.: PCT/JP2004/004894

§ 371 (c)(1),
(2), (4) Date: Sep. 23, 2005

(87) PCT Pub. No.: WO2004/091128

PCT Pub. Date: Oct. 21, 2004

(65) Prior Publication Data

US 2006/0190796 A1  Aug. 24, 2006

(30) Foreign Application Priority Data

Apr. 4, 2003  (JP)  ............................. 2003-101706

(51) Int. Cl.
  *H04B 7/216*  (2006.01)
(52) U.S. Cl. .................. 370/335; 370/230; 370/318; 370/342
(58) Field of Classification Search .......... 370/311, 370/230, 235, 318, 320, 328, 335, 441, 342, 370/394
See application file for complete search history.

(56) References Cited

U.S. PATENT DOCUMENTS

| 2002/0046379 | A1 |     | 4/2002  | Miki et al. |         |
|---|---|---|---|---|---|
| 2002/0071407 | A1 | *   | 6/2002  | Koo et al. | 370/335 |
| 2002/0114404 | A1 |     | 8/2002  | Aizawa et al. |      |
| 2002/0176362 | A1 | *   | 11/2002 | Yun et al. | 370/236 |
| 2003/0007476 | A1 | *   | 1/2003  | Kim et al. | 370/342 |
| 2003/0039226 | A1 | *   | 2/2003  | Kwak | 370/329 |
| 2003/0097629 | A1 | *   | 5/2003  | Moon et al. | 714/751 |
| 2003/0147474 | A1 | *   | 8/2003  | Ha et al. | 375/295 |
| 2004/0028020 | A1 | *   | 2/2004  | Frederiksen et al. | 370/342 |

(Continued)

FOREIGN PATENT DOCUMENTS

EP  1401139  3/2004

(Continued)

OTHER PUBLICATIONS

PCT International Search Report dated May 25, 2004.

(Continued)

*Primary Examiner*—Ricky Ngo
*Assistant Examiner*—Wei-Po Kao
(74) *Attorney, Agent, or Firm*—Dickinson Wright, PLLC

(57) ABSTRACT

An RV pattern selection section (103) stores at least two RV parameter tables, for QPSK and 16QAM, selects a corresponding RV parameter Xrv from the RV parameter tables based on a correlation between an estimated transmission count input from a transmission count estimation section (101) and a coding rate input from a coding rate calculation section (102) and outputs the RV parameter Xrv to a channel coding section (104). The channel coding section (104) changes a rate matching pattern of transmission data and constellation rearrangement (applicable to 16QAM only) based on the RV parameter Xrv input from the RV pattern selection section (103).

6 Claims, 9 Drawing Sheets

U.S. PATENT DOCUMENTS

2004/0137931 A1* 7/2004 Sarkar et al. ............. 455/522
2005/0226182 A1* 10/2005 Itoh ........................ 370/329

FOREIGN PATENT DOCUMENTS

| JP | 2002009692 | 1/2002 |
| JP | 2002009741 | 1/2002 |
| JP | 2003018131 | 1/2003 |
| JP | 2003-226864 | 8/2003 |
| WO | 0232009 | 4/2002 |

OTHER PUBLICATIONS

3GPP TS 25.212 v5.3.0 (Dec. 2002); 3rd Generation Partnership Project; Technical Specification Group Radio Access Network; Multiplexing and channel coding (FDD) (Release 5); pp. 1-74.

3GPP TS 25.101 v5.5.0 (Dec. 2002); 3rd Generation Partnership Project; Technical Specification Group Radio Access Network; UE Radio Transmission and Reception (FDD) (Release 5); pp. 1-83.

Japanese Office Action dated Jul. 8, 2008 with English translation thereof.

* cited by examiner

| ESTIMATED RECEPTION COUNT | RV PARAMETER | | |
|---|---|---|---|
| | CODING RATE $0 <= x <= x1$ | CODING RATE $x1 <= x <= x2$ | CODING RATE $x2 <= x <= 1$ |
| 1 | RV_a_T1 | RV_b_T1 | RV_c_T1 |
| 2 | RV_a_T2 | RV_b_T2 | RV_c_T2 |
| .. | .. | .. | .. |
| N | RV_a_TN | RV_b_TN | RV_c_TN |

| RV ESTIMATED TRANSMISSION COUNT | | | | | |
|---|---|---|---|---|---|
| QPSK | | | 16QAM | | |
| CODING RATE 0<=x<=x1 | CODING RATE x1<x<=x2 | CODING RATE x2<x<=1 | CODING RATE 0<=x<=y1 | CODING RATE y1<x<=y2 | CODING RATE y2<x<=1 |
| 0 | 0 | 0 | 0 | 0 | 0 |

(B)

| RV ESTIMATED TRANSMISSION COUNT | | | | | |
|---|---|---|---|---|---|
| QPSK | | | 16QAM | | |
| CODING RATE 0<=x<=x1 | CODING RATE x1<x<=x2 | CODING RATE x2<x<=1 | CODING RATE 0<=x<=y1 | CODING RATE y1<x<=y2 | CODING RATE y2<x<=1 |
| 0 | 1 | 0 | 0 | 0 | 0 |

(C)

| RV ESTIMATED TRANSMISSION COUNT | | | | | |
|---|---|---|---|---|---|
| QPSK | | | 16QAM | | |
| CODING RATE 0<=x<=x1 | CODING RATE x1<x<=x2 | CODING RATE x2<x<=1 | CODING RATE 0<=x<=y1 | CODING RATE y1<x<=y2 | CODING RATE y2<x<=1 |
| 0 | 2 | 0 | 0 | 0 | 0 |

(D)

| RV ESTIMATED TRANSMISSION COUNT | | | | | |
|---|---|---|---|---|---|
| QPSK | | | 16QAM | | |
| CODING RATE 0<=x<=x1 | CODING RATE x1<x<=x2 | CODING RATE x2<x<=1 | CODING RATE 0<=x<=y1 | CODING RATE y1<x<=y2 | CODING RATE y2<x<=1 |
| 0 | 2 | 1 | 0 | 0 | 0 |

FIG.6

| Tx | CR=1/3 | | | CR=1/2 | | | CR=4/5 | | |
|---|---|---|---|---|---|---|---|---|---|
| | 3GPP [dB] | OPTIMAL RV [dB] | DIFFERENCE [dB] | 3GPP [dB] | OPTIMAL RV [dB] | DIFFERENCE [dB] | 3GPP [dB] | OPTIMAL RV [dB] | DIFFERENCE [dB] |
| 1 | -11.0 | -11.2 | 0.2 | -8.3 | -8.5 | 0.2 | -3.5 | -3.5 | 0.0 |
| 2 | -14.3 | -14.8 | 0.5 | -12.9 | -12.9 | 0.0 | -8.6 | -9.5 | 0.9 |
| 3 | -16.6 | -16.8 | 0.2 | -14.2 | -14.9 | 0.7 | -11.8 | -12.1 | 0.3 |
| 4 | -18.2 | -18.3 | 0.1 | -16.1 | -16.3 | 0.2 | -13.4 | -13.6 | 0.2 |

FIG.7

HYBRID ARQ COMMUNICATION APPARATUS AND METHOD

TECHNICAL FIELD

The present invention relates to a radio transmission apparatus and radio transmission method.

BACKGROUND ART

Conventionally, HSDPA (High Speed Downlink Packet Access) is available as a high-speed packet transmission scheme based on a W-CDMA (Wideband Code Division Multiple Access) scheme. The HSDPA adopts HARQ. The HARQ (Hybrid Automatic Repeat reQuest) is a scheme which combines retransmission control (ARQ: Automatic Repeat reQuest) and error correcting coding processing.

A HSDPA-compliant base station adopts a "HARQ function" shown in step S807 in a flow chart of transmission data processing in FIG. 1. Data to be transmitted is subjected to turbo coding at a coding rate of ⅓ and the HARQ function performs a rate change to adapt the data to the number of physical channel bits to be actually transmitted.

The hardware configuration of this HARQ function is as shown in a block diagram in FIG. 2 and a second rate matching section 904 determines which bits should be transmitted using systematic priority parameter s and rate matching parameter r.

That is, the second rate matching section 904 determines how to execute rate matching (adaptation to the actual number of physical channels) on various types of data such as Systematic (hereinafter referred to as "systematic"), Parity1, Parity2 (hereinafter referred to as "parity 1" and "parity 2") included in coded transmission data which has been turbo coded before being transmitted.

For example, the second rate matching section 904 determines transmission priority of systematic data or transmission priority of parity 1, 2 or in what pattern the bits of parity 1, 2 should be punctured (or repeated) etc.

Changing systematic priority parameter s and rate matching parameter r in this way allows different transmission bit patterns to be transmitted at the times of initial transmission and retransmission and makes it easier to obtain a coding gain.

Furthermore, when an HSDPA-compliant base station uses 16QAM (Quadrature Amplitude Modulation) as its modulation scheme, it further adopts Constellation Rearrangement (rearrangement of phase arrangement).

In this case, as shown in 16QAM rearrangement processing in step S810 of FIG. 1, in 16QAM, bit reliability varies between signal points. For this reason, by changing constellation rearrangement parameter b upon retransmission and changing the signal constellation, bit reality is equalized for ease of Turbo decoding and coding gain is achieved.

The HSDPA-compliant base station gives an RV (Redundancy version) parameter to two HARQ parameters (systematic priority parameters, rate matching parameter r) and constellation rearrangement parameter b, changes a rate matching pattern and constellation rearrangement (applicable to 16QAM only) for every transmission count to determine transmission bits.

When the modulation scheme of the HSDPA-compliant base station is QPSK and 16QAM, examples of setting of RV parameter Xrv are shown in Table 1 and Table 2.

TABLE 1

| Xrv(value) | s | r |
|---|---|---|
| 0 | 1 | 0 |
| 1 | 0 | 0 |
| 2 | 1 | 1 |
| 3 | 0 | 1 |
| 4 | 1 | 2 |
| 5 | 0 | 2 |
| 6 | 1 | 3 |
| 7 | 0 | 3 |

TABLE 2

| Xrv(value) | s | r | b |
|---|---|---|---|
| 0 | 1 | 0 | 0 |
| 1 | 0 | 0 | 0 |
| 2 | 1 | 1 | 1 |
| 3 | 0 | 1 | 1 |
| 4 | 1 | 0 | 1 |
| 5 | 1 | 0 | 2 |
| 6 | 1 | 0 | 3 |
| 7 | 1 | 1 | 0 |

Table 1 shows set values of QPSK RV parameter Xrv based on the 3GPP TS25.212 specification and Table 2 shows set values of 16QAM RV parameter Xrv based on the 3GPP TS25.212 specification.

In Table 1 and Table 2, when systematic priority parameter s=1, transmission of systematic data is given priority and when systematic priority parameter s=0, transmission of parity data 1, 2 is given priority.

Furthermore, as is conventionally described in the 3GPP TS25.101 (see 3GPP TS 25.101 V5.5.0 (2002-12); Technical Specification Group Radio Access Network: UE Radio Transmission and Reception (FDD) (Release 5)), transmission is carried out with an RV parameter defined for every transmission count as shown in Table 3 and Table 4.

TABLE 3

| | Transmission count | | |
|---|---|---|---|
| Transmission Count | Xrv | s | r |
| 1 | 0 | 1 | 0 |
| 2 | 2 | 1 | 1 |
| 3 | 5 | 0 | 2 |
| 4 | 6 | 1 | 3 |

TABLE 4

| | Transmission count | | | |
|---|---|---|---|---|
| Transmission Count | Xrv | s | r | b |
| 1 | 6 | 1 | 0 | 3 |
| 2 | 2 | 1 | 1 | 1 |
| 3 | 1 | 0 | 0 | 0 |
| 4 | 5 | 1 | 0 | 2 |

However, as described in the conventional 3GPP TS25.101 (Non-Patent Document 1) and shown in Table 3 and Table 4, transmission is carried out with an RV parameter defined for every transmission count according to a modulation scheme, and therefore there has been a problem that transmission according to the coding rate of transmission data and with an RV parameter corresponding to an appropriate transmission count is not carried out.

That is, an RV parameter is uniquely set according to the modulation scheme and transmission count and data is retransmitted by selecting a determined transmission bit pattern, and therefore there is a problem that a variation occurs in reception quality of retransmission data and the HSDPA-compliant base station cannot reduce the retransmission count.

DISCLOSURE OF INVENTION

The present invention is intended to solve these problems and it is an object of the present invention to provide a radio transmission apparatus and radio transmission method capable of setting retransmission parameters for an appropriate transmission count according to a coding rate of transmission data, performing control in such a way that a power distribution increases uniformly when the receiving side combines retransmission data and thereby making reception quality of data uniform.

The radio transmission apparatus according to an aspect of the present invention is a radio transmission apparatus based on a hybrid ARQ scheme that retransmits transmission data to a reception apparatus based on a retransmission request from the reception apparatus, having the function of selecting retransmission parameters in such a way that reception power of initial transmission data and all the retransmission data increases when the reception apparatus receives and combines the retransmission data.

The radio transmission apparatus according to another aspect of the present invention is a radio transmission apparatus based on a hybrid ARQ scheme that retransmits transmission data to a reception apparatus based on a retransmission request from the reception apparatus, comprising a transmission count estimation section that estimates a transmission count based on a retransmission request from the reception apparatus, a coding rate calculation section that calculates a coding rate based on a set modulation scheme, transmission data and the number of codes, a selection section that selects retransmission parameters based on a set modulation scheme, the estimated transmission count estimated by the transmission count estimation section and coding rate calculated by the coding rate calculation section in such a way that reception power of all retransmission data at the reception apparatus increases and a coding section that codes the transmission data based on the retransmission parameter selected by the selection section and generates retransmission data.

The radio transmission apparatus according to a further aspect of the present invention is a radio transmission apparatus based on a hybrid ARQ scheme that retransmits transmission data to a reception apparatus based on a retransmission request from the reception apparatus, comprising a transmission count estimation section that estimates a transmission count based on a retransmission request from the reception apparatus, a coding rate calculation section that calculates a coding rate based on a set modulation scheme, transmission data and the number of codes, an RV estimated transmission count setting section that sets an estimated transmission count for a retransmission parameter based on a set modulation scheme, estimated transmission count estimated by the transmission count estimation section and coding rate calculated by the coding rate calculation section and a selection section that selects retransmission parameters based on a set modulation scheme, the estimated transmission count for a retransmission parameter set by the RV estimated transmission count setting section and coding rate calculated by the coding rate calculation section in such a way that reception power of all retransmission data at the reception apparatus increases and a coding section that codes the transmission data based on the retransmission parameter selected by the selection section and generates retransmission data.

The radio transmission method according to a still further aspect of the present invention is a radio transmission method based on a hybrid ARQ scheme that retransmits transmission data to a reception apparatus based on a retransmission request from the reception apparatus, comprising a step of selecting a retransmission parameter in such a way that reception power of initial transmission data and all the retransmission data increases when the reception apparatus receives and combines the retransmission data.

The radio transmission method according to a still further aspect of the present invention is a radio transmission method based on a hybrid ARQ scheme that retransmits transmission data to a reception apparatus based on a retransmission request from the reception apparatus, comprising a transmission count estimation step of estimating a transmission count based on a retransmission request from the reception apparatus, a selection step of selecting retransmission parameters based on a set modulation scheme, the estimated transmission count estimated as described above and coding rate calculated as described above in such a way that reception power of all retransmission data at the reception apparatus increases and a coding step of coding the transmission data based on the selected retransmission parameter and generating retransmission data.

The radio transmission method according to a still further aspect of the present invention is a radio transmission method based on a hybrid. ARQ scheme that retransmits transmission data to a reception apparatus based on a retransmission request from the reception apparatus, comprising a transmission count estimation step of estimating a transmission count based on a retransmission request from the reception apparatus, a coding rate calculation step of calculating a coding rate based on a set modulation scheme, transmission data and the number of codes, an RV estimated transmission count setting step of setting an estimated transmission count for a retransmission parameter based on a set modulation scheme, the estimated transmission count estimated as described above and the calculated coding rate, a selection step of selecting retransmission parameters based on a set modulation scheme, the RV estimated transmission count for the set retransmission parameter and the calculated coding rate in such a way that reception power of all retransmission data at the reception apparatus increases and a coding step of coding the transmission data based on the selected retransmission parameter and generating retransmission data.

BRIEF DESCRIPTION OF DRAWINGS

FIG. 4 illustrates an example of an RV parameter table used in the transmission apparatus according to Embodiment 1 of the present invention;

FIG. 6A illustrates an initial state of an RV estimated transmission count section in the transmission apparatus according to Embodiment 2 of the present invention;

FIG. 6B illustrates an initial transmission count of the RV estimated transmission count section in the transmission apparatus according to Embodiment 2 of the present invention;

FIG. 6C illustrates a second transmission count of the RV estimated transmission count section in the transmission apparatus according to Embodiment 2 of the present invention;

FIG. 6D illustrates a third transmission count of the RV estimated transmission count section in the transmission apparatus according to Embodiment 2 of the present invention;

FIG. 7 illustrates simulation results when transmission data is retransmitted three times by the transmission apparatus according to Embodiment 1 or Embodiment 2 of the present invention and conventional 3GPP;

BEST MODE FOR CARRYING OUT THE INVENTION

With reference now to the attached drawings, embodiments of the present invention will be explained in detail below. Note that the present invention is not limited to these embodiments and can be implemented modified in various ways within a range not departing from the spirit thereof.

An essence of the present invention is to set a retransmission parameter for an appropriate transmission count corresponding to a coding rate of transmission data, perform control in such a way that a power distribution increases uniformly when retransmission data is combined on the receiving side and make reception quality of the data uniform.

Embodiment 1

Figure 1:
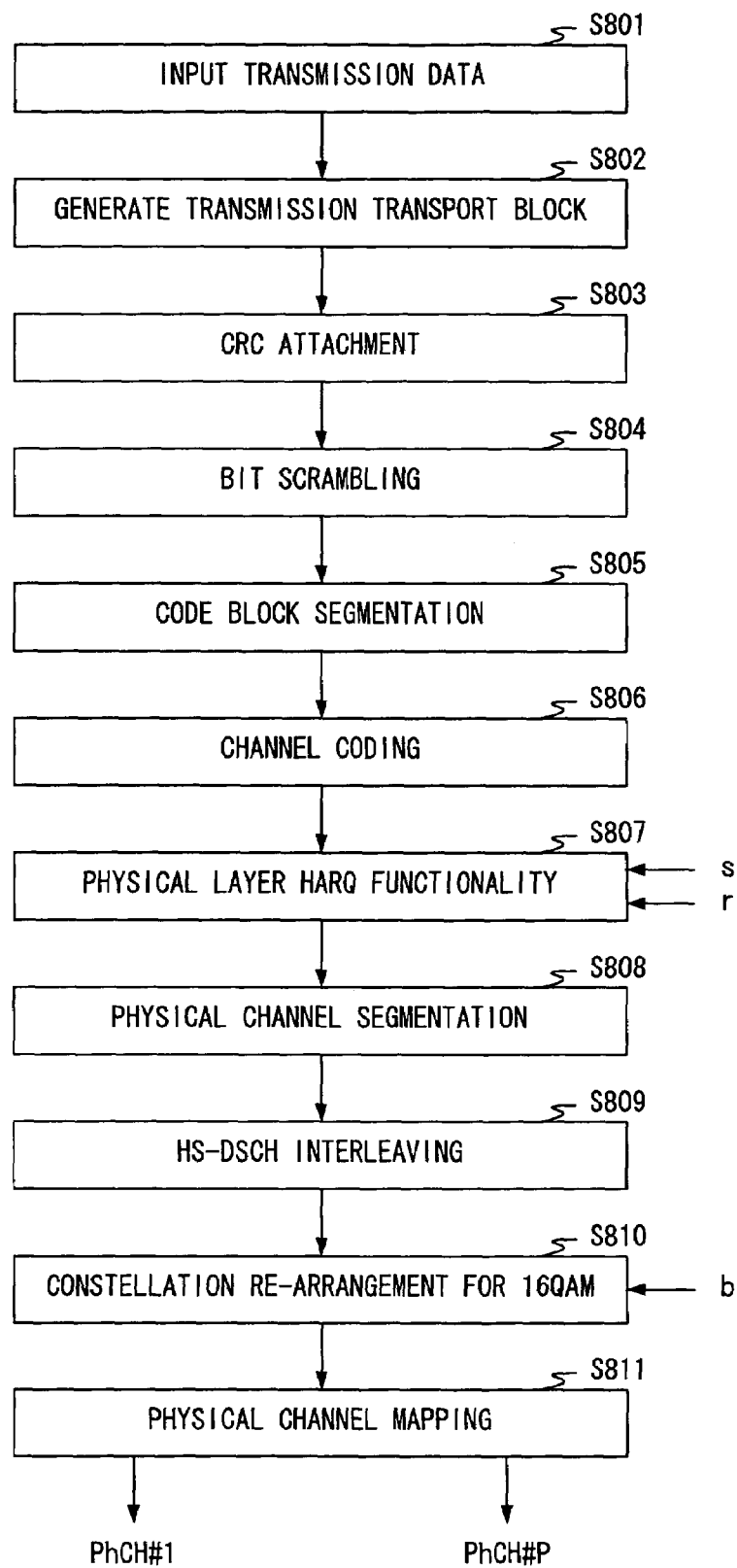
FIG. 1 is a flow chart showing transmission data processing by a conventional HARQ-compliant base station.
Figure 2:
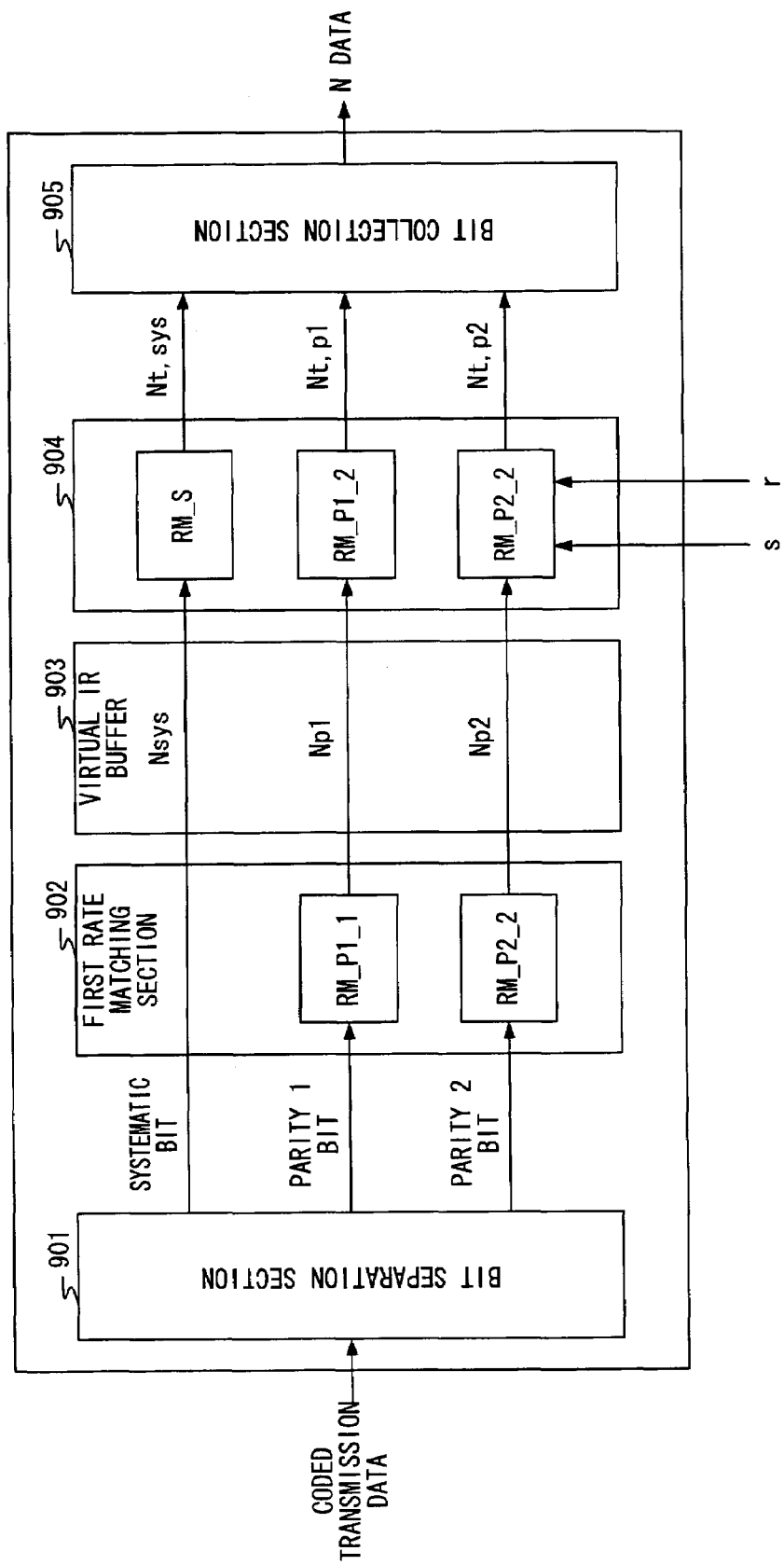
FIG. 2 is a block diagram showing the configuration of a HARQ function section of the conventional HARQ-compliant base station.
Figure 3:
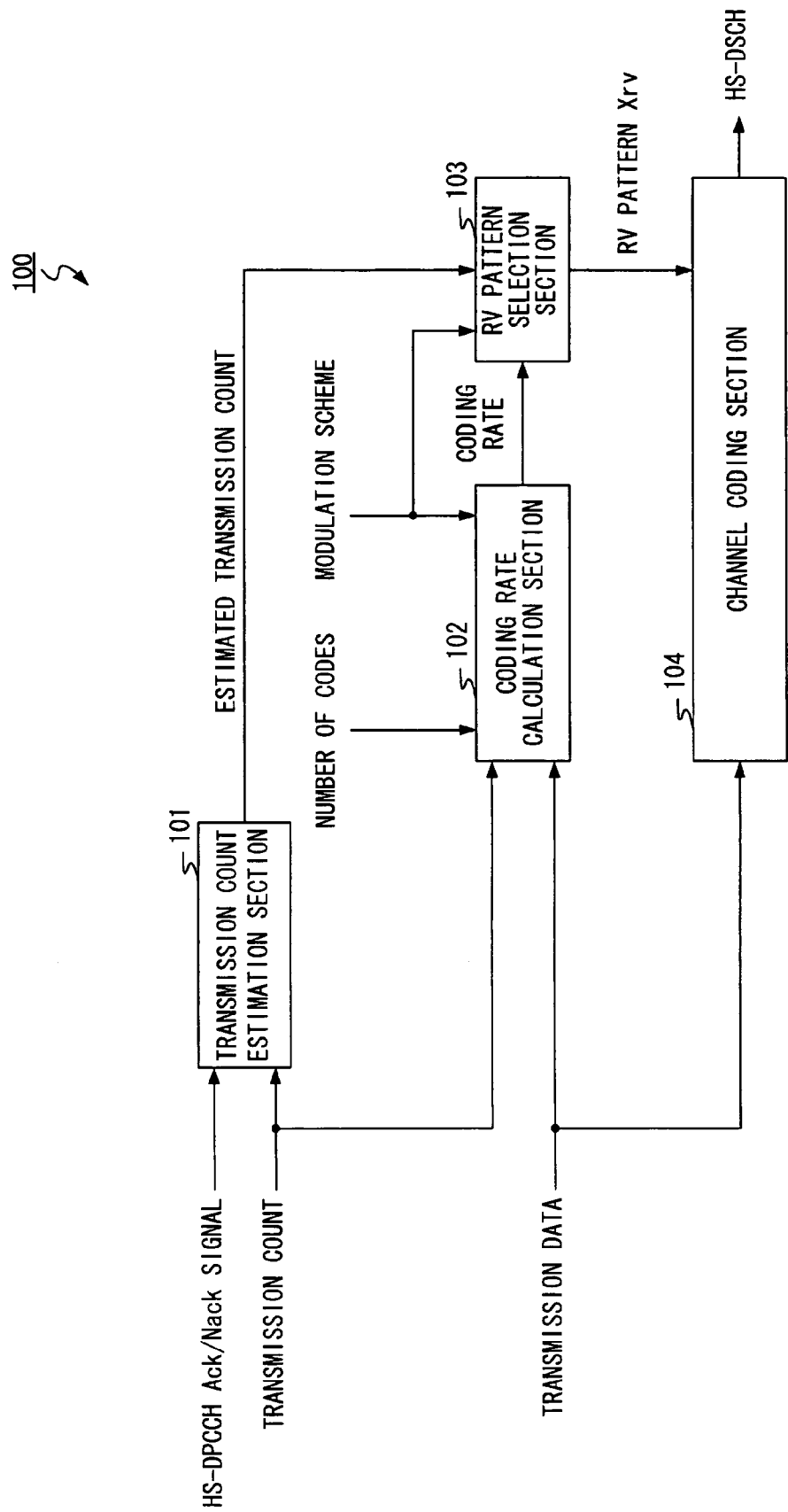
FIG. 3 is a block diagram showing the configuration of main components of a transmission apparatus according to Embodiment 1 of the present invention.

FIG. 3 is a block diagram showing the configuration of main components of an HSDPA-compliant transmission apparatus according to Embodiment 1 of the present invention.

The transmission apparatus 100 is mainly constructed of a transmission count estimation section 101, a coding rate calculation section 102, an RV pattern selection section 103 and a channel coding section 104.

The transmission count estimation section 101 estimates a transmission count at which data should have been successfully transmitted to a reception terminal (not shown) based on an Ack (Acknowledgment)/Nack (Negative Acknowledgment) signal from an uplink HS-DPCCH (Dedicated Physical Control Channel (uplink) for HS-DSCH) received from the reception terminal and a transmission count and outputs the estimated transmission count to the RV pattern selection section 103.

When a Nack signal is received, the transmission count estimation section 101 outputs data with the estimated transmission count incremented by 1 and when an Ack/Nack signal cannot be received at the due reception timing, transmission is assumed to have failed, and therefore the transmission count estimation section 101 outputs the data without incrementing the estimated transmission count.

On the premise that the modulation scheme and the number of codes are constant at the times of initial transmission and retransmission, the coding rate calculation section 102 calculates a coding rate based on transmission data input at the time of initial transmission, transmission count, the number of codes and modulation scheme (e.g., QPSK or 16QAM) and outputs the calculated coding rate to the RV pattern selection section 103.

The RV pattern selection section 103 stores at least two RV parameter tables shown in FIG. 4, for QPSK and 16QAM, selects the corresponding RV parameter Xrv (e.g., RV_a_T1) from the RV parameter table based on the correlation between the estimated transmission count input from the transmission count estimation section 101 and the coding rate input from the coding rate calculation section 102 and outputs the RV parameter to the channel coding section 104.

The RV parameter table shown in FIG. 4 divides a coding rate into three ranges, sets an RV parameter Xrv (coding rate $0 \leq x < x1$: RV_a_T1, ..., RV_a_TN, etc.) for every estimated transmission count within these ranges of coding rates and the parameters compliant with QPSK and 16QAM shown in Table 1 and Table 2 are set in these RV parameters Xrv.

The channel coding section 104 executes channel coding processing based on the RV parameter Xrv input from the RV pattern selection section 103 and sends the transmission bits obtained by changing the rate matching pattern and constellation rearrangement (applicable to 16QAM only) of the input transmission data as an HS-DSCH (High Speed-Downlink Shared Channel).

Thus, according to the transmission apparatus of this embodiment, it is possible to set an RV parameter corresponding to an appropriate transmission count according to the coding rate of transmission data and retransmit transmission data.

Embodiment 2

Figure 5:
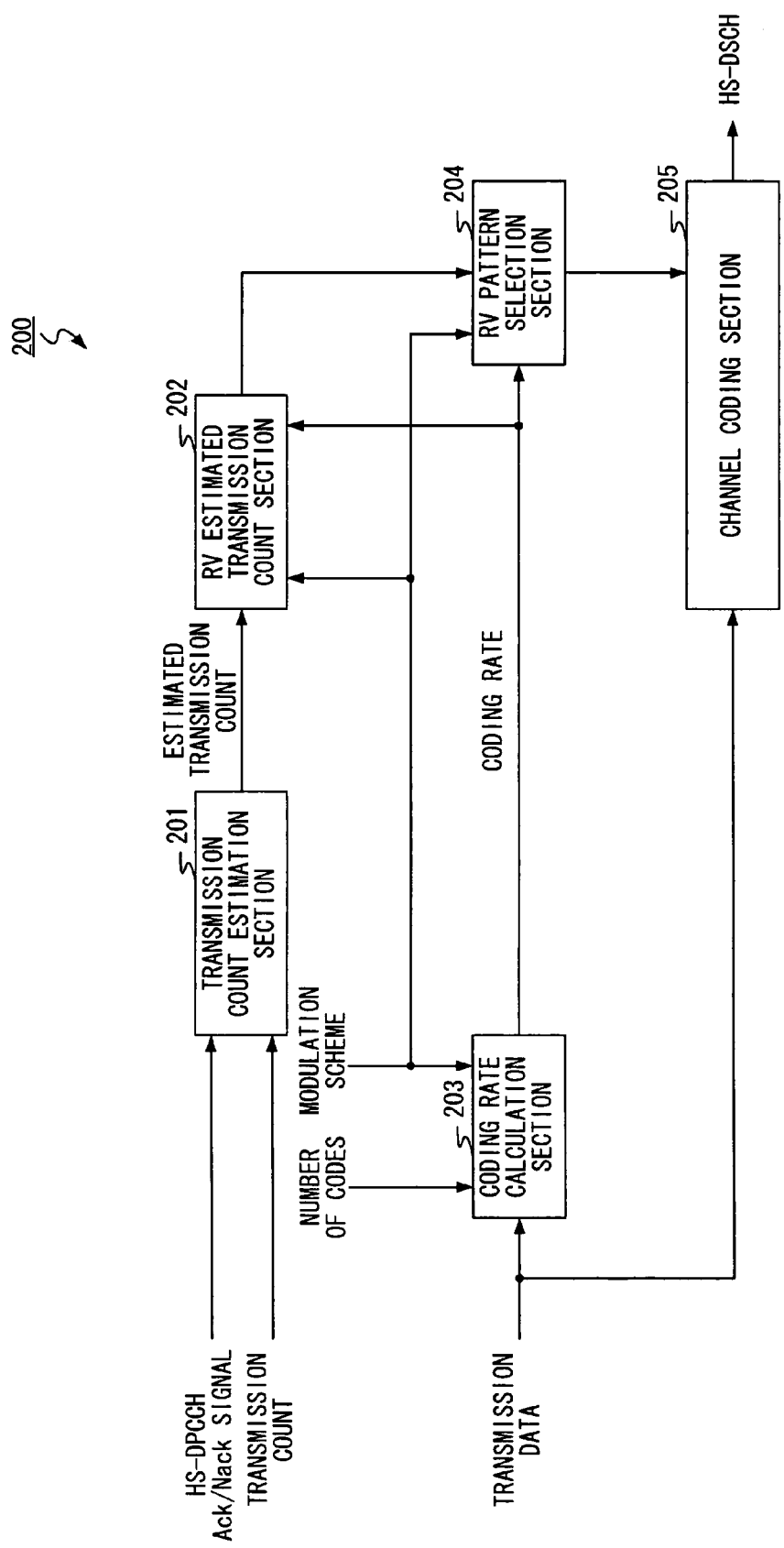
FIG. 5 is a block diagram showing the configuration of main components of a transmission apparatus according to Embodiment 2 of the present invention.

FIG. 5 is a block diagram showing the configuration of main components of an HSDPA-compliant transmission apparatus 200 according to Embodiment 2 of the present invention. The transmission apparatus 200 differs from Embodiment 1 in that a coding rate is always calculated for every transmission count and the transmission apparatus can handle even a case where the number of transmission codes is changed and the coding rate changes a great deal or the modulation scheme is changed.

The transmission apparatus 200 is mainly constructed of a transmission count estimation section 201, an RV estimated transmission count section 202, a coding rate calculation section 203, an RV pattern selection section 204 and a channel coding section 205.

The transmission count estimation section 201, coding rate calculation section 203, RV pattern selection section 204 and channel coding section 205 have the same functions as those of the transmission count estimation section 101, coding rate calculation section 102, RV pattern selection section 103 and channel coding section 104 shown in Embodiment 1, and therefore explanations thereof will be omitted.

The RV estimated transmission count section 202 sets an RV estimated transmission count shown in FIGS. 6A to D based on an input modulation scheme, estimated transmission count input from the transmission count estimation section 201 and coding rate input from the coding rate calculation section 203 and outputs the RV estimated transmission count to the RV pattern selection section 204.

In the initial state (when estimated transmission count is 0) shown in FIG. 6A, all RV estimated transmission counts are "0" regardless of the modulation scheme and coding rate. When the estimated transmission count is 1 as shown in FIG. 6B, if the modulation scheme is QPSK and coding rate is (x1<x≦x2), the RV estimated transmission count is "1."

When the estimated transmission count is 2 as shown in FIG. 6C, if the coding rate and modulation scheme are the same as those at the count 1, the RV estimated transmission count is incremented to "2." When the estimated transmission count is 3 as shown in FIG. 6D, if the coding rate is the same as that at the count 2 and the coding rate is different from x2<x≦1, the newly selected modulation scheme and coding rate are combined, and therefore the RV estimated transmission count is "1."

Therefore, according to the transmission apparatus of this embodiment, even when the number of transmission codes is changed and the coding rate is changed a great deal or the modulation scheme is changed, it is possible to set an RV parameter for an appropriate transmission count corresponding to the coding rate of transmission data and retransmit the transmission data.

FIG. 7 shows simulation results when an RV parameter is set and transmission data is retransmitted three times using the transmission apparatus explained in Embodiment 1 above or the transmission apparatus explained in Embodiment 2 and when an RV parameter is set and transmission data is retransmitted three times using the conventional 3GPP scheme.

FIG. 7 shows a gain difference [dB] between a gain (3GPP [dB]) of Ec/Ior (Ec: power given to HS-DSCH, Ior: total transmission power of transmission apparatus) according to a conventional scheme and a gain (optimal RV [dB]) of Ec/Ior according to the scheme of the present invention corresponding to each transmission count Tx of 1 to 4 when the modulation scheme is 16QAM and a varying coding rate CR of ⅓, ½, ⅘.

As is clear from FIG. 7, the scheme of the present invention can acquire a better gain than the conventional scheme. The reason is that data is transmitted for each block of different coding rates in such a way that SIRs (Signal to Interference Ratio) of coding bits are kept as constant as possible for every transmission count as shown in FIGS. 8 and 9.

Figure 8:
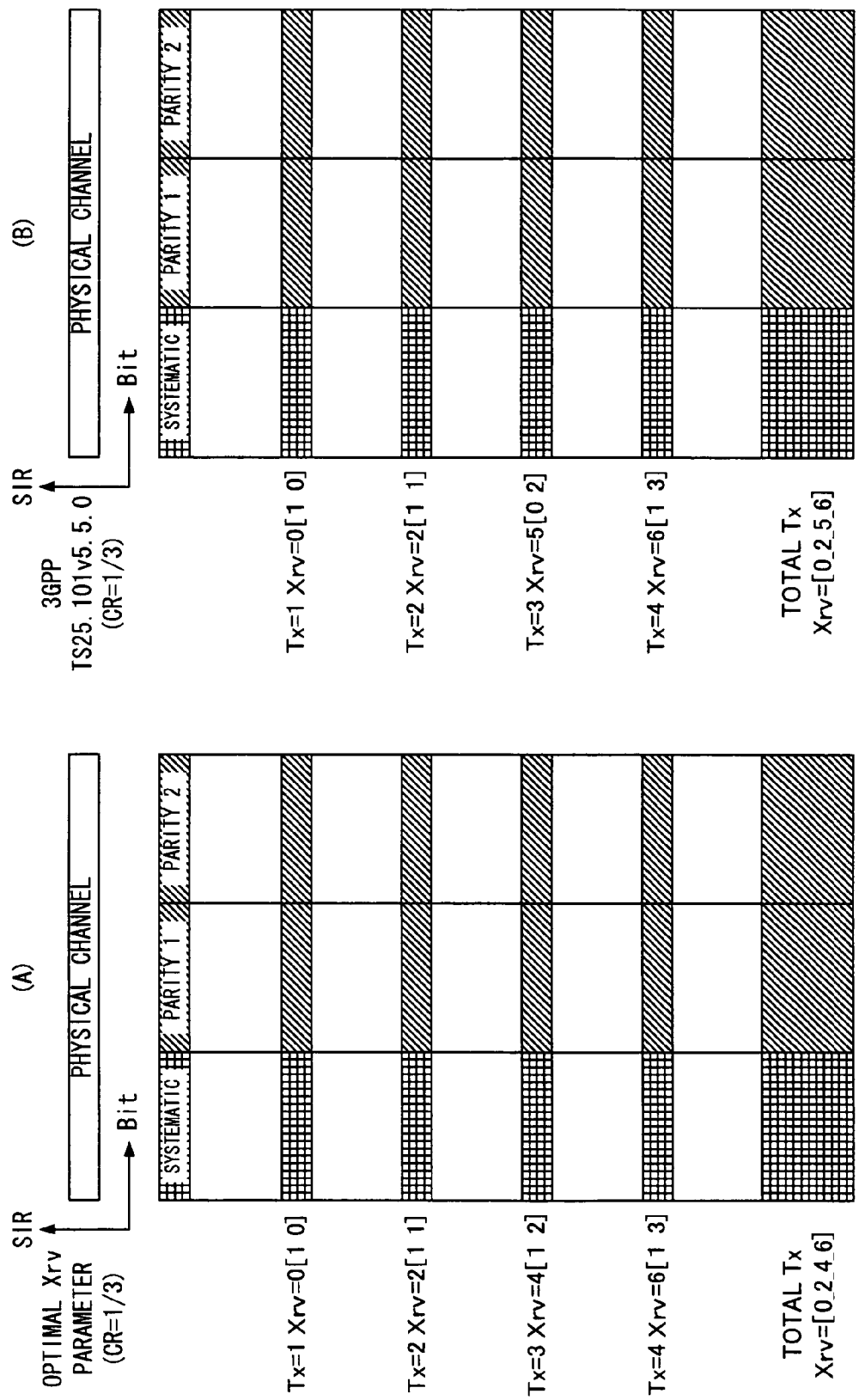
FIG. 8 illustrates a state of data assignment for every transmission count with RV parameters changed with QPSK and at a coding rate of $\frac{1}{3}$ expressed in the form of blocks in a transmission apparatus according to Embodiment 1 or Embodiment 2 of the present invention and the conventional 3GPP.
Figure 9:
FIG. 9 illustrates a state of data assignment for every transmission count with RV parameters changed with QPSK and at a coding rate of $\frac{4}{5}$ expressed in the form of blocks in a transmission apparatus according to Embodiment 1 or Embodiment 2 of the present invention and the conventional 3GPP.

FIGS. 8 and 9 show a state of data assignment of systematic data, parity data 1, 2 for every transmission count in the form of blocks when the modulation scheme is QPSK and an RV parameter is changed for each coding rate. The horizontal axis shows Bit and the vertical axis shows SIR.

FIG. 8 shows a situation of data assignment (A in the same figure) with an optimal Xrv parameter, which is the scheme of the present invention, when the coding rate CR is ⅓ for every transmission count Tx of 1 to 4 and a situation of data assignment (B in the same figure) according to the 3GPP (TS25.101 v5.5.0), which is the conventional scheme.

FIG. 9 likewise shows the scheme of the present invention (A in the same figure) when the coding rate CR is ⅘ and conventional scheme (B in the same figure) Here, descriptions like Xrv=0[10] shown next to Tx=1 to 4 in the figure illustrate contents of the selected RV parameter.

In FIG. 8, there is no significant difference between the scheme of the present invention and the conventional scheme. However, as shown in FIG. 9, when the coding rate CR is ⅘, the conventional scheme sets RV parameters patterned according to the coding rate, and therefore a variation occurs in the SIR vs. Bit as an addition result (Sum Tx) of systematic data and parity 1, 2 data through four transmissions, whereas the SIR vs. Bit is equalized as an addition result (Sum Tx) of systematic data and parity 1, 2 data through four transmissions according to the scheme of the present invention.

For this reason, the use of the transmission apparatus shown in Embodiment 1 or the transmission apparatus shown in Embodiment 2 facilitates the use of turbo decoding at a reception terminal and can reduce a retransmission count.

This application is based on the Japanese Patent Application No. 2003-101706 filed on Apr. 4, 2003, entire content of which is expressly incorporated by reference herein.

INDUSTRIAL APPLICABILITY

The present invention can realize control in such a way that a power distribution increases uniformly when the receiving side combines retransmission data and make reception quality of data uniform.

What is claimed is:

1. A radio communication apparatus based on a hybrid ARQ scheme that retransmits transmission data to a reception apparatus based on a retransmission request from said reception apparatus, comprising:

a transmission count estimation section that estimates a transmission count based on a retransmission request from said reception apparatus;

a coding rate calculation section that calculates a coding rate based on a set modulation scheme, transmission data and the number of codes;

a selection section that selects retransmission parameters based on said set modulation scheme, the estimated transmission count estimated by said transmission count estimation section and coding rate calculated by said coding rate calculation section in such a way that reception power of all retransmission data at said reception apparatus increases; and a coding section that codes said transmission data based on the selected retransmission parameter selected by said selection section and generates retransmission data.

2. The radio transmission apparatus according to claim 1, wherein said selection section stores a table in which retransmission parameters are set based on said estimated transmission count and said coding rate for each said modulation scheme.

3. A radio transmission apparatus based on a hybrid ARQ scheme that retransmits transmission data to a reception apparatus based on a retransmission request from said reception apparatus, comprising:

a transmission count estimation section that estimates a transmission count based on a retransmission request from said reception apparatus;

a coding rate calculation section that calculates a coding rate based on a set modulation scheme, transmission data and the number of codes;

an RV estimated transmission count setting section that sets an estimated transmission count for a retransmission parameter based on said set modulation scheme, estimated transmission count estimated by said transmission count estimation section and coding rate calculated by said coding rate calculation section;

a selection section that selects retransmission parameters based on said set modulation scheme, the RV estimated transmission count for retransmission parameters set by said RV estimated transmission count setting section and coding rate calculated by said coding rate calculation section in such a way that reception power of all retransmission data at said reception apparatus increases; and a coding section that codes said transmission data based on the retransmission parameter selected by said selection section and generates retransmission data.

4. The radio transmission apparatus according to claim 3, wherein said selection section stores a table in which retransmission parameters are set based on said RV estimated transmission count and said coding rate for each said modulation scheme.

5. A radio transmission method based on a hybrid ARQ scheme that retransmits transmission data to a reception apparatus based on a retransmission request from said reception apparatus, comprising:

a transmission count estimation step of estimating a transmission count based on a retransmission request from said reception apparatus;

a coding rate calculation step of calculating a coding rate based on a set modulation scheme, transmission data and the number of codes;

a selection step of selecting retransmission parameters based on said set modulation scheme, said estimated transmission count and said calculated coding rate in such a way that reception power of all retransmission data at said reception apparatus increases; and a coding step of coding said transmission data based on said selected retransmission parameter and generating retransmission data.

6. A radio transmission method based on a hybrid ARQ scheme that retransmits transmission data to a reception apparatus based on a retransmission request from said reception apparatus, comprising:

a transmission count estimation step of estimating a transmission count based on a retransmission request from said reception apparatus;

a coding rate calculation step of calculating a coding rate based on a set modulation scheme, transmission data and the number of codes;

an RV estimated transmission count setting step of setting an RV estimated transmission count for a retransmission parameter based on said set modulation scheme, said estimated RV estimated transmission count and said calculated coding rate;

a selection step of selecting retransmission parameters based on said set modulation scheme, said RV estimated transmission count for said set retransmission parameter and said calculated coding rate in such a way that reception power of all retransmission data at said reception apparatus increases; and a coding step of coding said transmission data based on said selected retransmission parameter and generating retransmission data.

* * * * *